United States Patent

Thorn

[15] 3,690,053
[45] Sept. 12, 1972

[54] MOBILE HYDRAULIC FRUIT PICKER

[72] Inventor: Roy B. Thorn, P.O. Box 711, Inverness, Fla. 32650

[22] Filed: Aug. 26, 1971

[21] Appl. No.: 175,050

[52] U.S. Cl. .............................................. 56/328 R
[51] Int. Cl. ........................................... A01g 19/00
[58] Field of Search .................. 56/328 R, 330, 30, 1

[56] References Cited

UNITED STATES PATENTS

| | | | |
|---|---|---|---|
| 2,660,021 | 11/1953 | McDowell | 56/330 |
| 2,996,868 | 8/1961 | Voelker | 56/328 R |
| 3,006,131 | 10/1961 | McDowell | 56/330 |
| 3,584,442 | 6/1971 | White | 56/1 |
| 3,448,567 | 6/1969 | McGee | 56/328 R |
| 3,276,194 | 10/1966 | Mohn et al. | 56/330 |
| 3,568,417 | 3/1971 | Rauth | 56/1 |

Primary Examiner—Russell R. Kinsey
Attorney—Lloyd J. Andres

[57] ABSTRACT

A hydraulic fruit picker in which a vehicle is provided with a power operated elevator for raising and lowering a platform and operator with respect to the fruit area on a tree. The elevator includes a hydraulic device which mixes pressurized water and air into a bubble formation and ejects same at a high velocity from a nozzle. The device includes swivels whereby the operator may direct the output nozzle and water-air stream through azimuthal and vertical angles with respect to the tree. Thus the high velocity of the water-air mixture, when impinged upon ripe fruit, will detach same undamaged and permit it to gravitate for collection.

10 Claims, 7 Drawing Figures

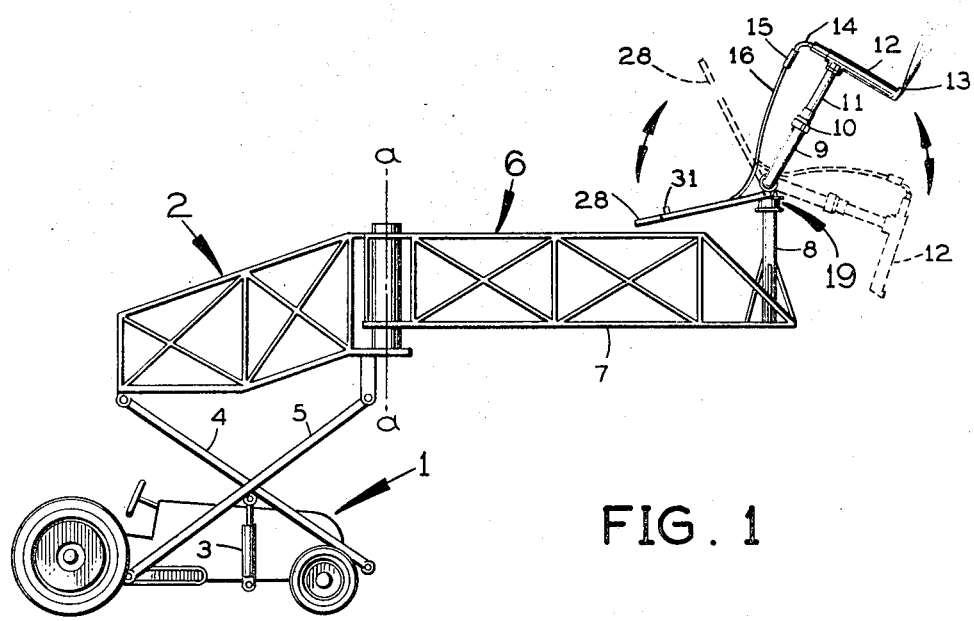
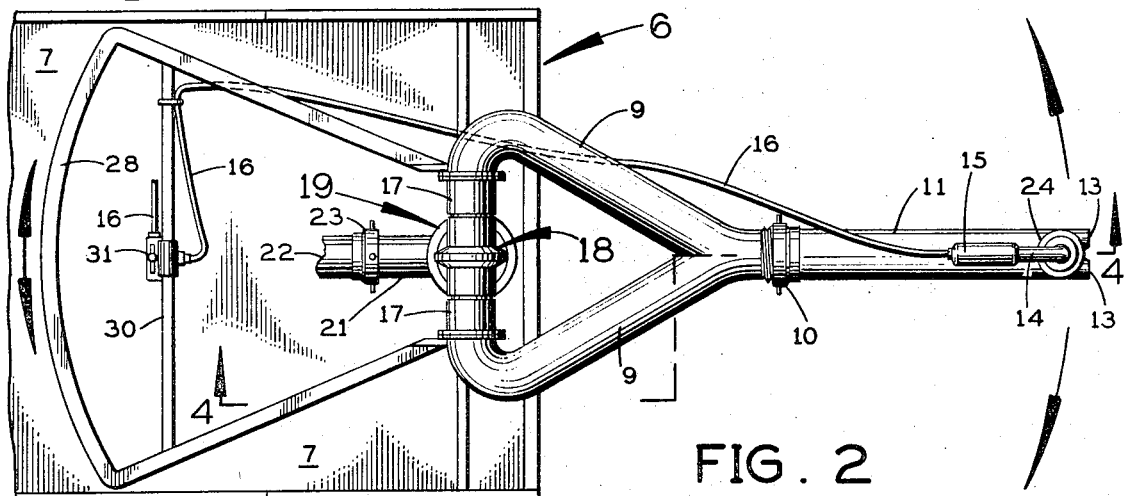
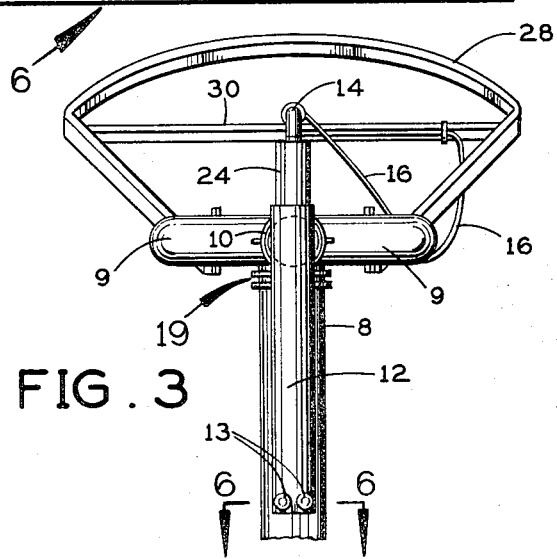
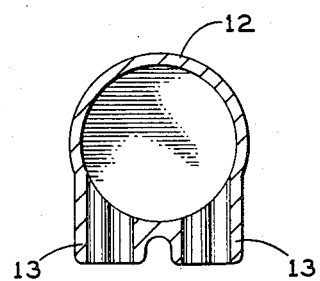
INVENTOR.
ROY B. THORN

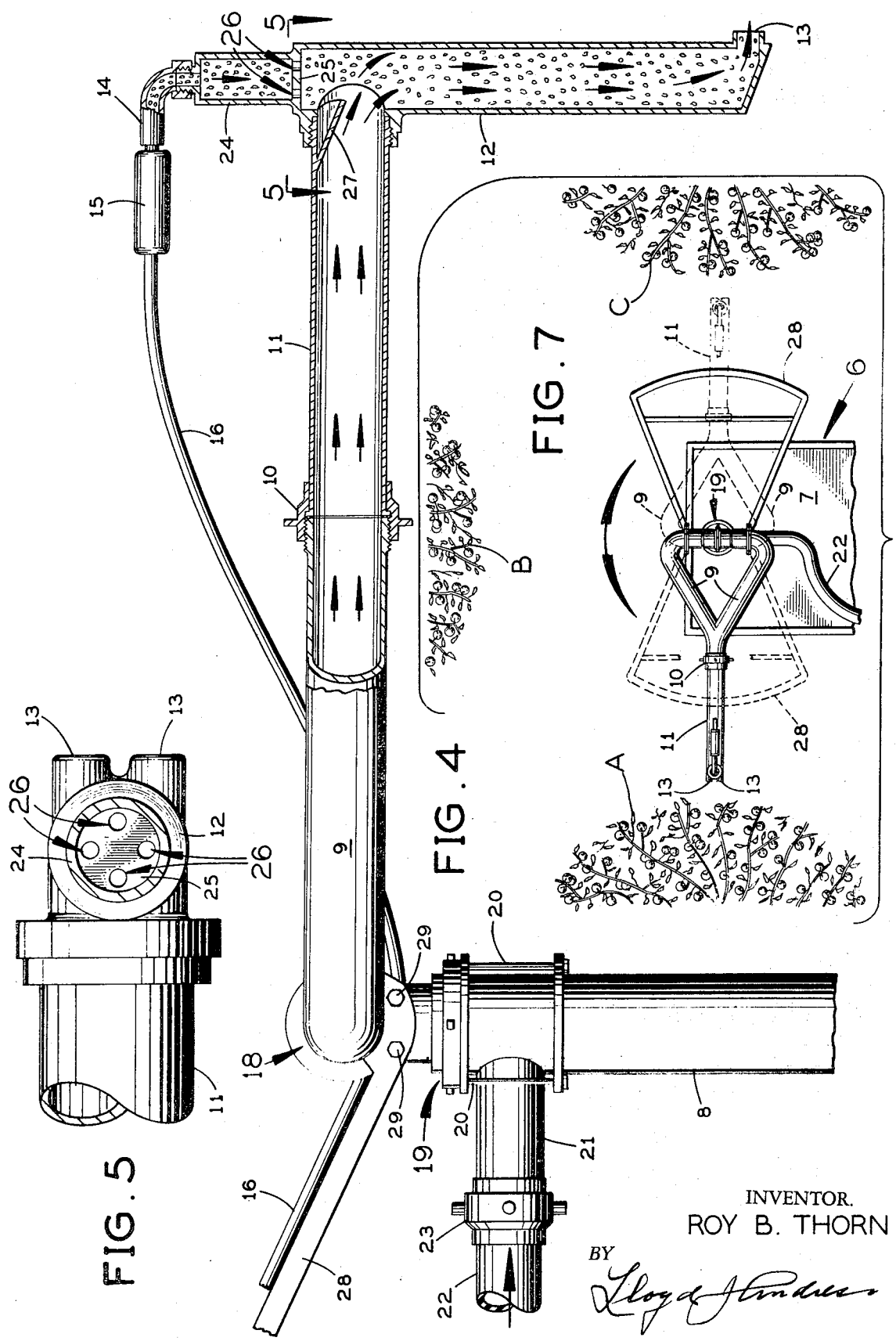

MOBILE HYDRAULIC FRUIT PICKER

This invention relates in general to mechanical fruit pickers and more particularly to hydraulic means for dislodging ripe fruit from the tree, particularly the citrus variety, by the impingement of a turbulent mixture of water and air.

Prior mechanical fruit picking devices utilized mechanical means for shaking and vibrating the tree to gravitate the fruit therefrom, which in many cases injured the tree because of excessive violence. Other mechanisms utilize rotary members having claws and the like for disengaging the ripe fruit from the tree and directing same into conveyors often damaged the fruit and usually limited the picking only to the readily available outer fruit, resulting in a second manual ladder picking to complete the picking operation.

The present invention overcomes the above objections and disadvantages by the provision of a hydraulic system involving a mechanism for projecting a stream of high velocity mixture of water and air, which when impinged upon the ripe fruit will cause the latter to descend when directed over large areas of the tree. Well known sheet material guidance collectors may be supplied under the tree to collect the fallen fruit or it may be rapidly hand picked from the ground.

A principal object of the invention is the provision of a simplified effective mobile fruit picking apparatus under the control of one or two operators whereby the movement of the hydraulic picker is limited, since the machine may be placed central of one to four trees and pick substantially all of the ripe fruit on the facing sides of each tree.

Another object of the invention is the provision of a vehicle and elevator controlled nozzle assembly which projects a high velocity intimate mixture of high pressure water and high pressure air in a bubble stream, which when impinged against ripened fruit will break the stem connection and permit the fruit to gravitate without damage thereto.

Another object of the invention is the provision of a water-air projector for a mixture of high pressure water and air, including a sealed swivel connection permitting manual azimuthal movement through a wide range as well as a wide vertical angle whereby a high velocity mixture of water and air may be effective to large areas without relocation of the projector.

These and other objects and advantages in one embodiment of the invention are described and shown in the following specification and drawings, in which:

FIG. 1 is a side elevation of the mobile hydraulic fruit picker in reduced scale.

FIG. 2 is a fragmentary enlarged plan view of the water-air projection structure shown in FIG. 1.

FIG. 3 is a front view in reduced scale of the nozzle structure shown in FIG. 2.

FIG. 4 is a fragmentary enlarged cross sectional elevation taken through section line 4—4, FIG. 2.

FIG. 5 is an enlarged cross sectional view taken through section line 5—5, FIG. 4.

FIG. 6 is an enlarged cross sectional view taken through section line 6—6, FIG. 3.

FIG. 7 is a fragmentary top plan view of the fruit picker illustrating the manual movement of the water-air projection device for removing fruit from three spaced trees.

Referring to FIG. 1, a conventional tractor 1 serves as a mobile foundation for an elevator assembly 2 which is operated by a pair of hydraulic cylinders 3, one on each opposite side of the tractor and normally under the control of the tractor operator.

The cylinders 3 are coupled to the elements through multiple lazy tong arms 4 and 5. The arms 4 and 5 on opposite sides of the tractor are not shown. A well known hydraulic pump system, also not shown, is normally driven by the engine of the tractor for providing the hydraulic energy for operating the cylinders for raising and lowering the elevator assembly 2, as desired.

A horizontal portion 6 of the elevator assembly 2 is adapted for either manual or power rotation about a vertical axis a—a in a semi-circular path and is provided with a floor 7 for supporting the water projector picking device and the operator therefor. A vertical support assembly 8 has the lower end thereof secured to the upper surface of the outer end portion of the floor 7 for retaining a universally adjustable water-air projector assembly at the upper end thereof, to be hereinafter described.

Referring to FIG. 2, the two triangular shaped water conducting legs 9 of the water projector terminating at the outer end thereof in a coupling 10 connected to an outlet tube 11 which is adapted to supply a water-air mixing tube 12, which in turn is provided with a pair of twin outlet nozzles 13 at its lower end and a compressed air inlet elbow coupling 14 at the opposite end thereof, with the elbow connected to one end of a conventional check valve assembly 15. The opposite end of the check valve is connected to a flexible conduit 16 for conducting compressed air to the mixing tube 12.

The two legs 9 complete a base to the triangular conductors by means of connections 17—17, which terminate in a well known vertical rotatable sealed coupling means 18 which is connected to another well known coupling means 19 for horizontal rotation secured to the top end of base 8 by long screws 20. A water inlet 21 is coupled to a flexible pressurized water supply hose or other flexible supply conduit 22 by a conventional coupling 23. Thus it is apparent that pressurized water will freely pass through the horizontal movable coupling 19 and the vertical moving coupling 18 and flow through both legs 9 into outlet tube 11 for high velocity distribution, to be hereinafter described.

Referring to FIG. 4, the mixing tube 12 terminates in a pair of twin projection nozzles 13, better shown in FIGS. 3 and 6, which will project the water and intimately mixed expanding air substantially normal to the axis of the mixing tube 12 as a result of the highly compressed air introduced into the air inlet portion 24 of tube 12 by distribution and control by the air in plate 25 having four spaced metering holes 26 therethrough.

A deflector plate 27 is secured in a downward deflecting angle in an outlet portion of the outlet tube 11 for forcing the water in a downward direction in the mixing tube 12.

Referring to FIGS. 2, 3, and 4, an arcuate handle 28 for controlling and manipulating the entire projection assembly is secured on two connection flanges 17 by two pair of screws 29, two of which are shown in FIG. 4, which secures the handle opposite the mixing tube 12. The handle includes a transverse member 30 for providing a termination of the air tube from the check valve into a manual control valve 31 from which a continuation of the conduit 16 continues to a conventional source of compressed air.

In operation and referring to FIG. 7, the power projecting end of the platform of the hydraulic picking machine is shown positioned equi-distance from three trees A, B, and C, which in some circumstances may be a central position for additional trees, not shown.

When the horizontal portion of the elevator assembly is adjusted to the right azimuthal direction and height position by the operator in the tractor and the forward end of the elevator is rotated about axis a-a manually or by mechanical means, not shown, then when water pressurized in the order of 100 pounds per square inch is introduced into hose 22 and compressed air in the order of 200 pounds per square inch is adjusted by valve 31 and applied through conduit 16 into the upper end 24 of tube 12, then the water will flow through outlet tube 11 and be deflected by plate 27 into mixing tube 12 at a relatively high velocity. Simultaneously, compressed air will flow through conduit 16, check valve 15, and elbow 14 into the upper end portion 24 of tube 12 and then through holes 26 in plate 25, at which point the pressurized air will thoroughly turbulate and mix with the water and the resultant water-air mixture will be projected from the nozzles 13 a substantial distance in a generally conical pattern.

It has been found that the rapidly expanding bubbles of air within the water, when impinged against ripe fruit on the trees, will dislodge the stems therefrom and permit the fruit to gravitate downward for manual or under the tree hopper collection.

It is apparent that the operator has wide control of raising, lowering, and laterally swinging the nozzle to impinge upon a large portion of the fruit on a particular portion of the tree. When the device is positioned as shown between trees, the nozzle can be swung in appropriate directions to obtain a large picking volume without moving the tractor.

Certain modifications in construction are intended to come within the teachings and scope of the above specification.

Having described my invention, I claim:

1. A mobile hydraulic fruit picker comprising a vehicle including an articulated overhead elevator means for retaining and supporting a substantially horizontal movable platform, manual controlled power means operatively associated with said vehicle and said elevator means for raising said platform from a lowermost position to an uppermost position and holding same in any selected position therebetween, a hydraulic projector base of predetermined height secured to and extending upward from an outer portion of said platform normal thereto including a water input hose coupling for receiving and conducting high pressure water through the top portion thereof, a rigid water conducting feeder means of predetermined length with one end thereof pivotally connected and communicating with the said top of said base by a hermetically sealed first water conducting swivel coupling adapted for substantially horizontal rotation of said feeder means about an axis vertical said platform, a second hermetically sealed water conducting swivel coupling secured to the upper end of said first swivel coupling and said feeder means for permitting vertical angular rotation thereof through a predetermined angle about an axis at right angles to the said vertical axis, a water-air mixing tube connected to and communicating with the outer end of said feeder means and positioned in a vertical plane substantially at right angles to said feeder means, at least one cylindrical outlet nozzle of predetermined diameter projecting from the lower end of said mixing tube on the side thereof opposite said support means, an air inlet coupling on said mixing tube at the end opposite said outlet nozzle, a source of compressed air of predetermined pressure, a flexible conduit connecting said source of air to said air inlet coupling, a source of pressurized water, a flexible hose connecting said source of water to said water input hose coupling whereby water will be conducted through said base and both said swivel couplings and through said feeder means and into said mixing tube and simultaneously air will be conducted into said tube for mixture with and turbulation of said water prior to the discharge of the turbulated mixture from said nozzle when said feeder means is manually directed in a selected azimuthal position and a selected vertical angle for the water impingement removal of fruit from trees.

2. The construction recited in claim 1 including a quadrant shaped handle secured to said feeder means and extending rearward thereof for manually rotating said feeder means and said first swivel coupling about an axis vertical said platform and rotating said feeder means and said second swivel coupling through a substantially vertical angle about an axis parallel said platform.

3. The construction recited in claim 1 including a deflection plate within the outlet portion of said feeder means secured therein at an angle sloping toward said nozzle for deflecting said pressurized water toward said nozzle and away from said air inlet coupling.

4. The construction recited in claim 1 including a perforated plate secured within said mixing tube between said air inlet coupling and the junction of said feeder means and said mixing tube for metering and distributing air into the flow of water from said feeder means.

5. The construction recited in claim 1 whereby said platform is pivotally secured for angular rotation about a vertical axis in said elevator and said base secured at the outer end portion thereof for permitting the latter to be moved within a predetermined azimuthal angle for effective positioning and hydraulic projection without movement of said vehicle.

6. A fruit picker comprising a vehicle including an elevator means for retaining and supporting a substantially horizontal platform, hydraulic means operatively associated with said vehicle and said elevator means for raising said platform from a lowermost position to an uppermost position and holding same in any selected position therebetween, a hydraulic projector base means of predetermined height secured to and extending upward from said platform normal thereto, said base means having a water input coupling and adapted and constructed to receive and conduct high pressure water through the top portion thereof, a water conducting feeder means of triangular shape with one side thereof centrally connected to said base through joined lateral and vertical sealed swivel couplings for permitting independent predetermined angular horizontal and vertical movement of said feeder means with respect to said platform and the remaining opposite triangular sides of said feeder means terminating in a central outlet tube for conducting pressurized water from said input coupling through said swivel couplings and divided around said opposite sides of said feeder means and joined to flow at high velocity through said outlet tube, a water-air mixing tube of predetermined length connected at a predetermined distance from the outer end of said outlet tube at substantially right angles thereto for conducting water from said outlet tube into said mixing tube, at least one cylindrical outlet nozzle of predetermined diameter projecting from the lower end of said mixing tube on the side thereof opposite said base means, an air inlet coupling on said mixing tube at the end thereof opposite said outlet nozzle, a source of compressed air of predetermined pressure, a flexible conduit connecting said source of air to said air inlet coupling, a source of pressurized water, a flexible conduit connecting said source of water to said water input coupling whereby water will be conducted through said top portion of said base means and said swivel couplings and said feeder means and said outlet tube into said mixing tube and thereby mixed with compressed air and delivered in the form of high velocity bubble stream from said nozzle.

7. The construction recited in claim 6 including two said cylindrical outlet nozzles of predetermined diameter projecting from the lower end of said mixing tube on the side thereof opposite said base means.

8. The construction recited in claim 6 including a check valve positioned in close proximity to the air inlet coupling and connected to said conduit for preventing water from entering said air conduit when the latter is depressurized.

9. The construction recited in claim 6 including a quadrant type manual handle secured to said feeder means for manually rotating the latter in both azimuthal and vertical directions.

10. The construction recited in claim 6 including a support means for said flexible air conduit on said handle including a pressure control valve for adjusting the quality of flow from said nozzles.

* * * * *